Figure 19:
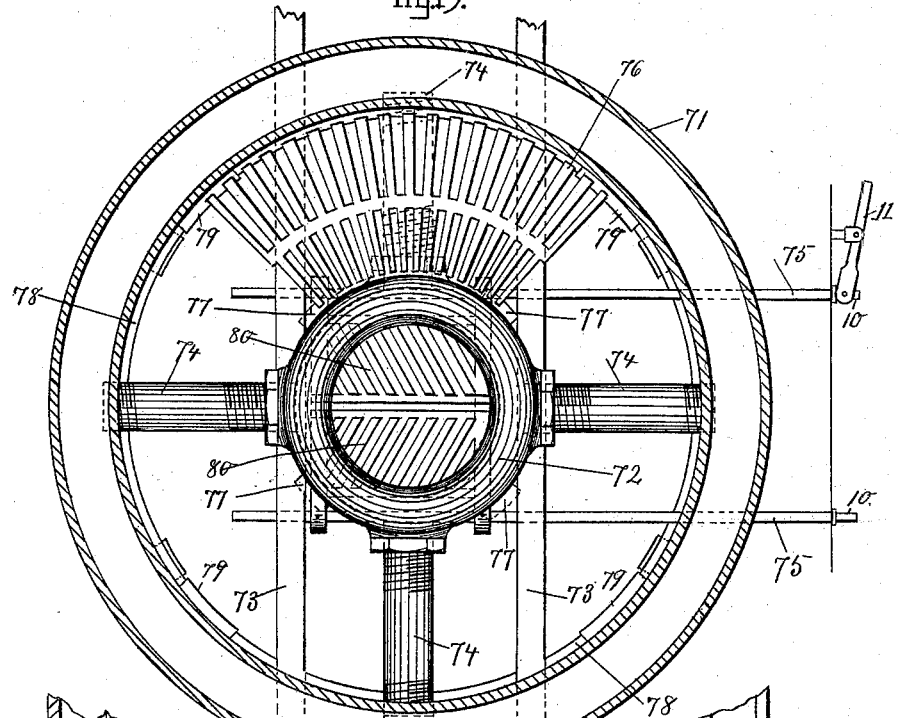

(No Model.)  6 Sheets—Sheet 1.
F. G. SAYLOR.
STEAM OR HOT WATER GRATE AND GENERATOR.
No. 604,088. Patented May 17, 1898.
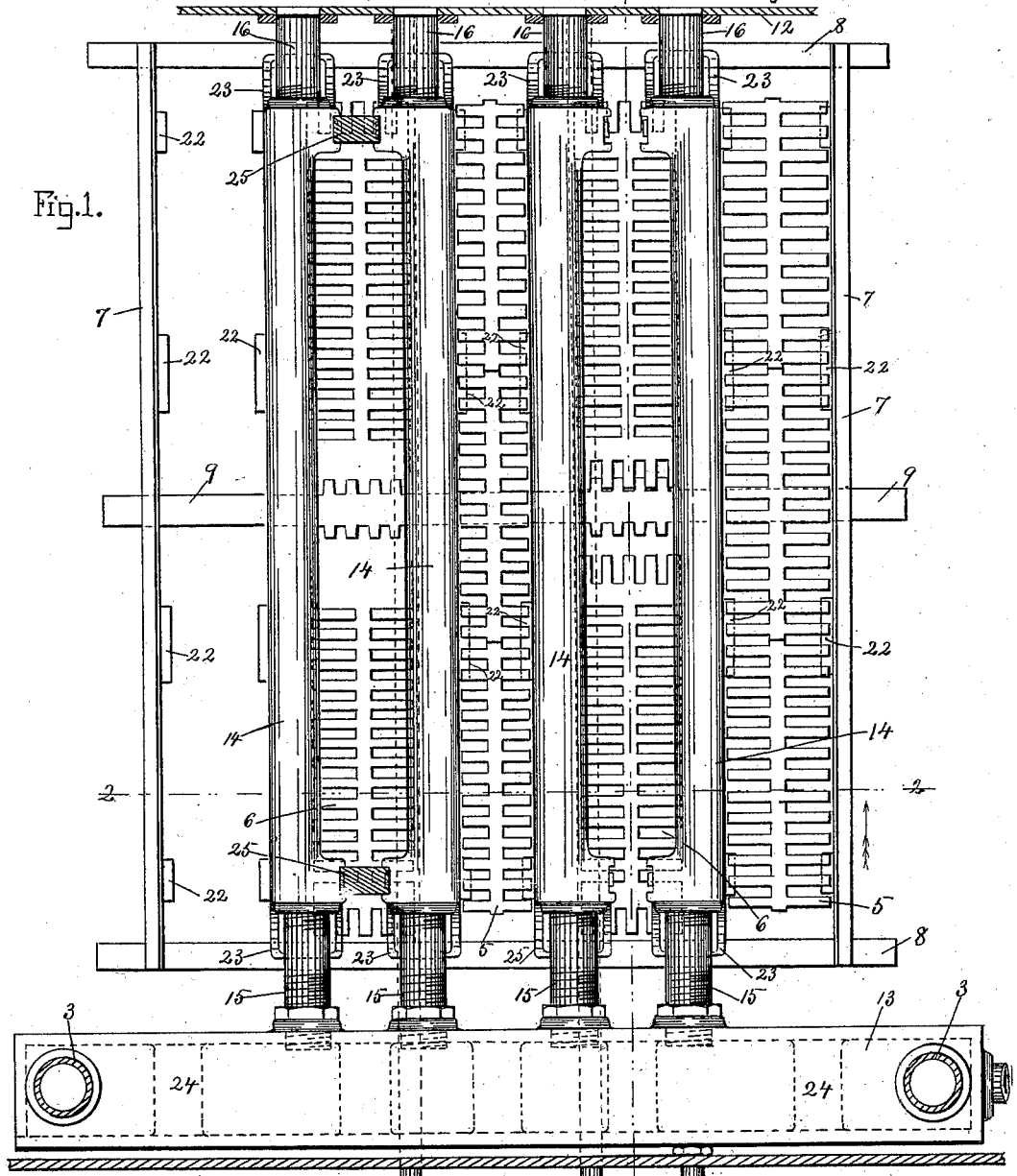
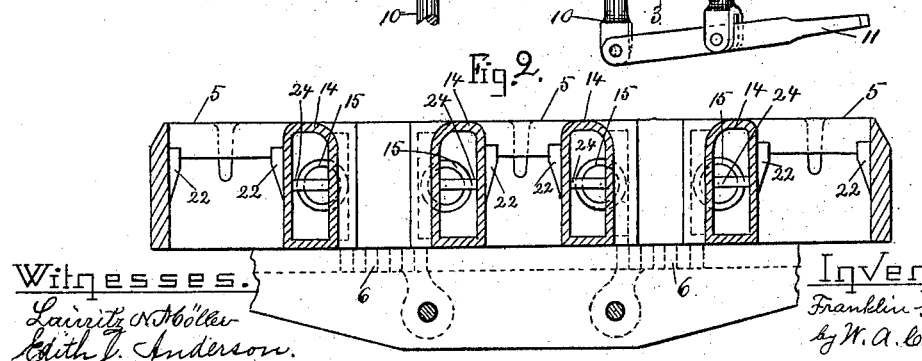

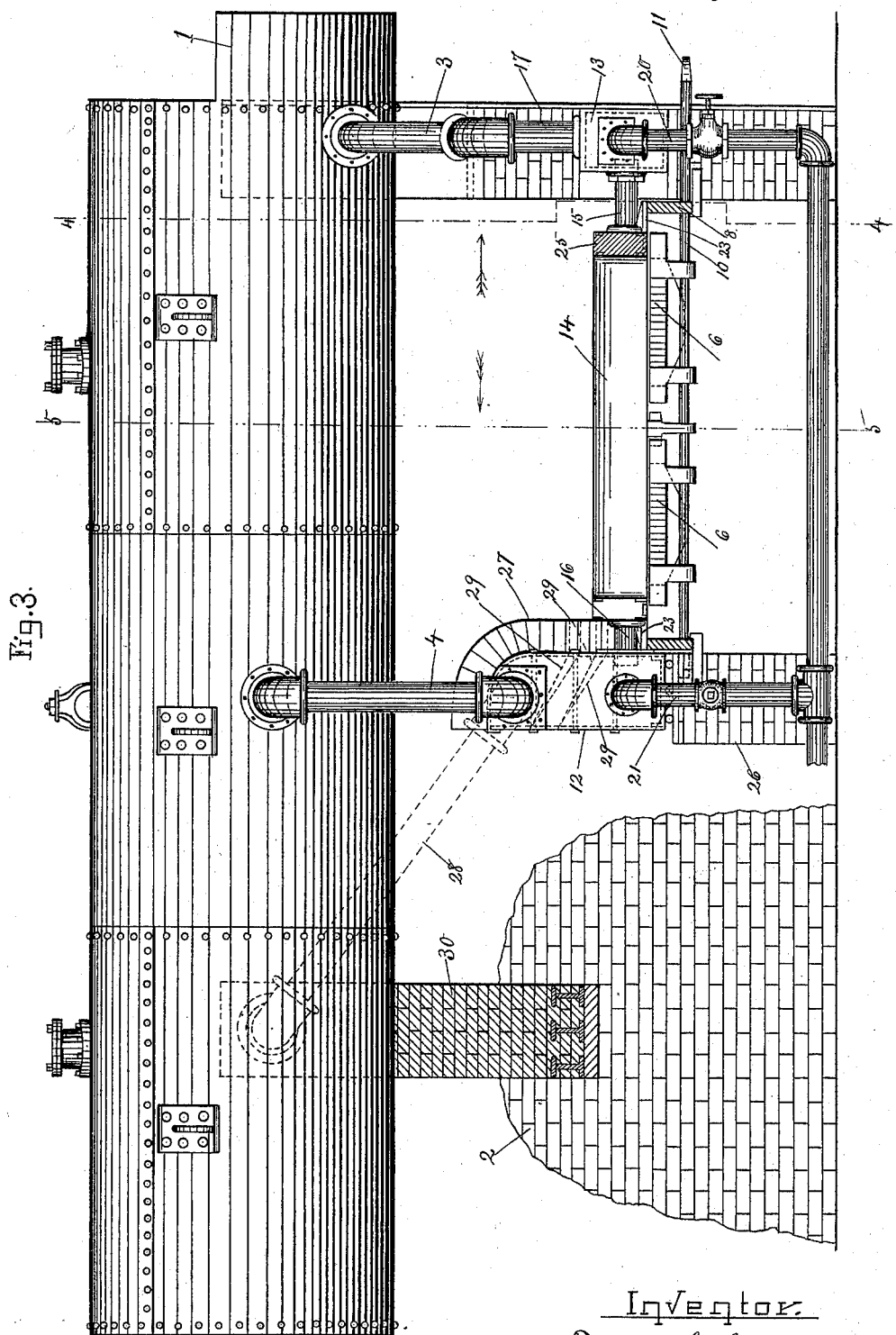

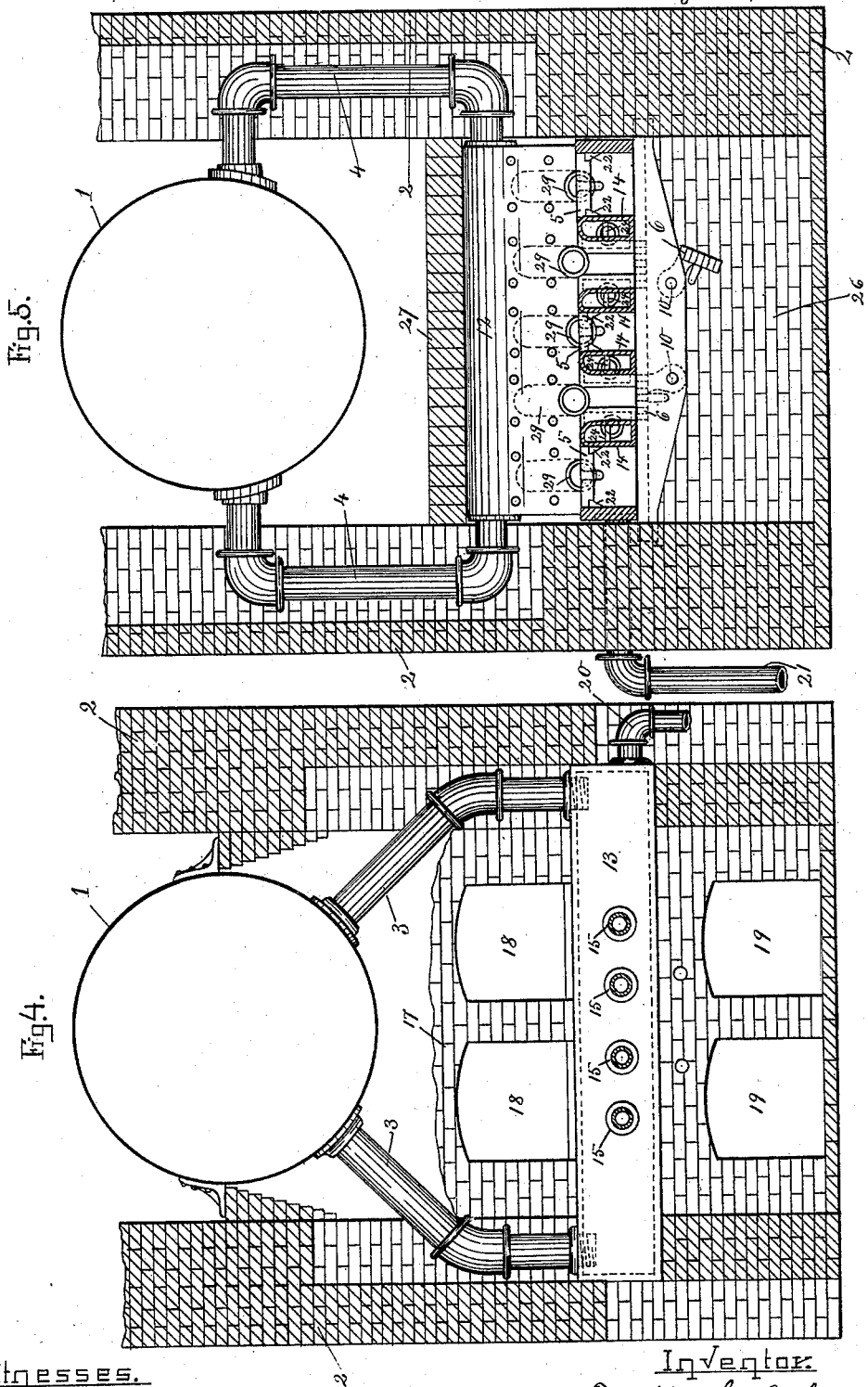

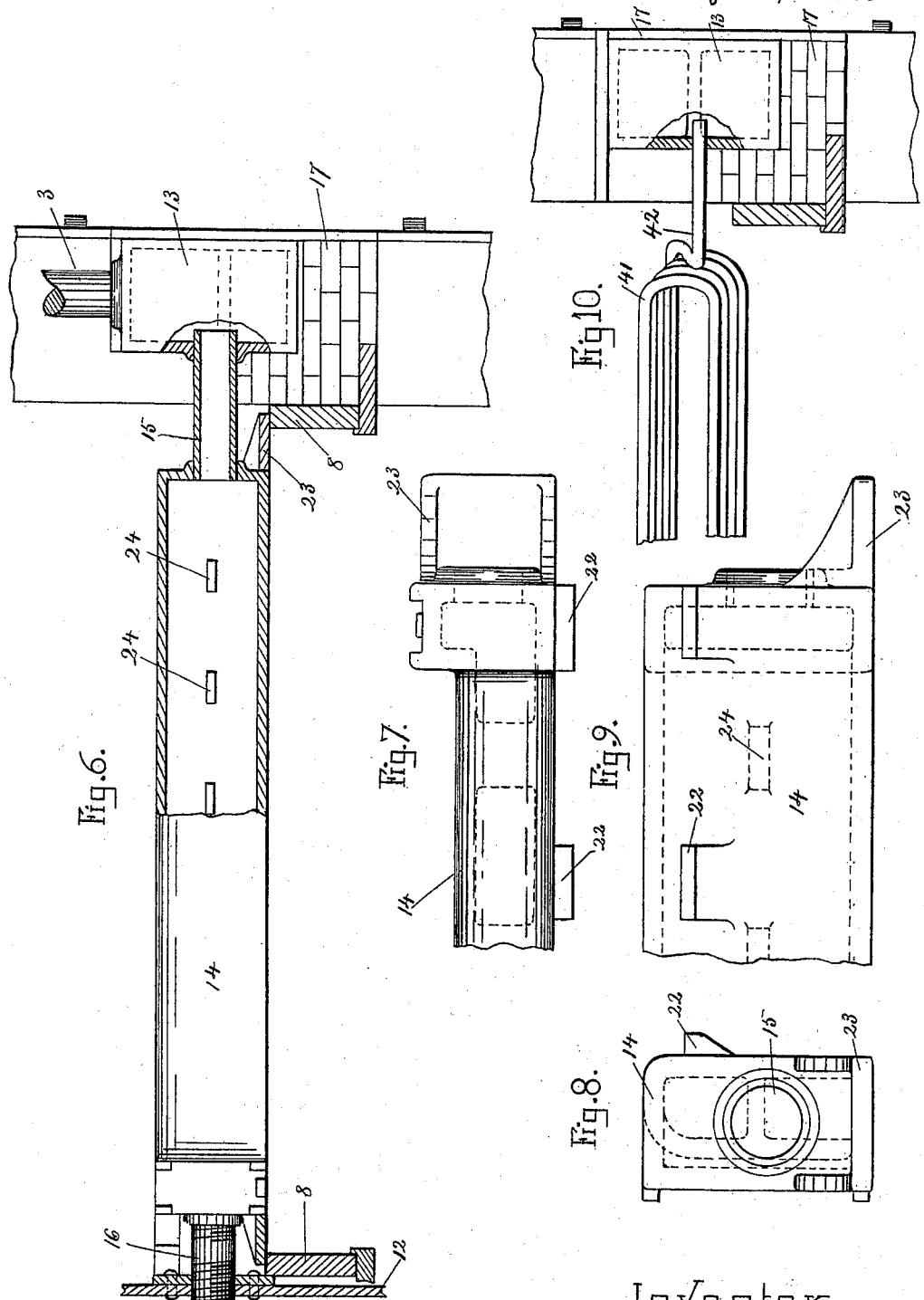

(No Model.) 6 Sheets—Sheet 5.
F. G. SAYLOR.
STEAM OR HOT WATER GRATE AND GENERATOR.
No. 604,088. Patented May 17, 1898.
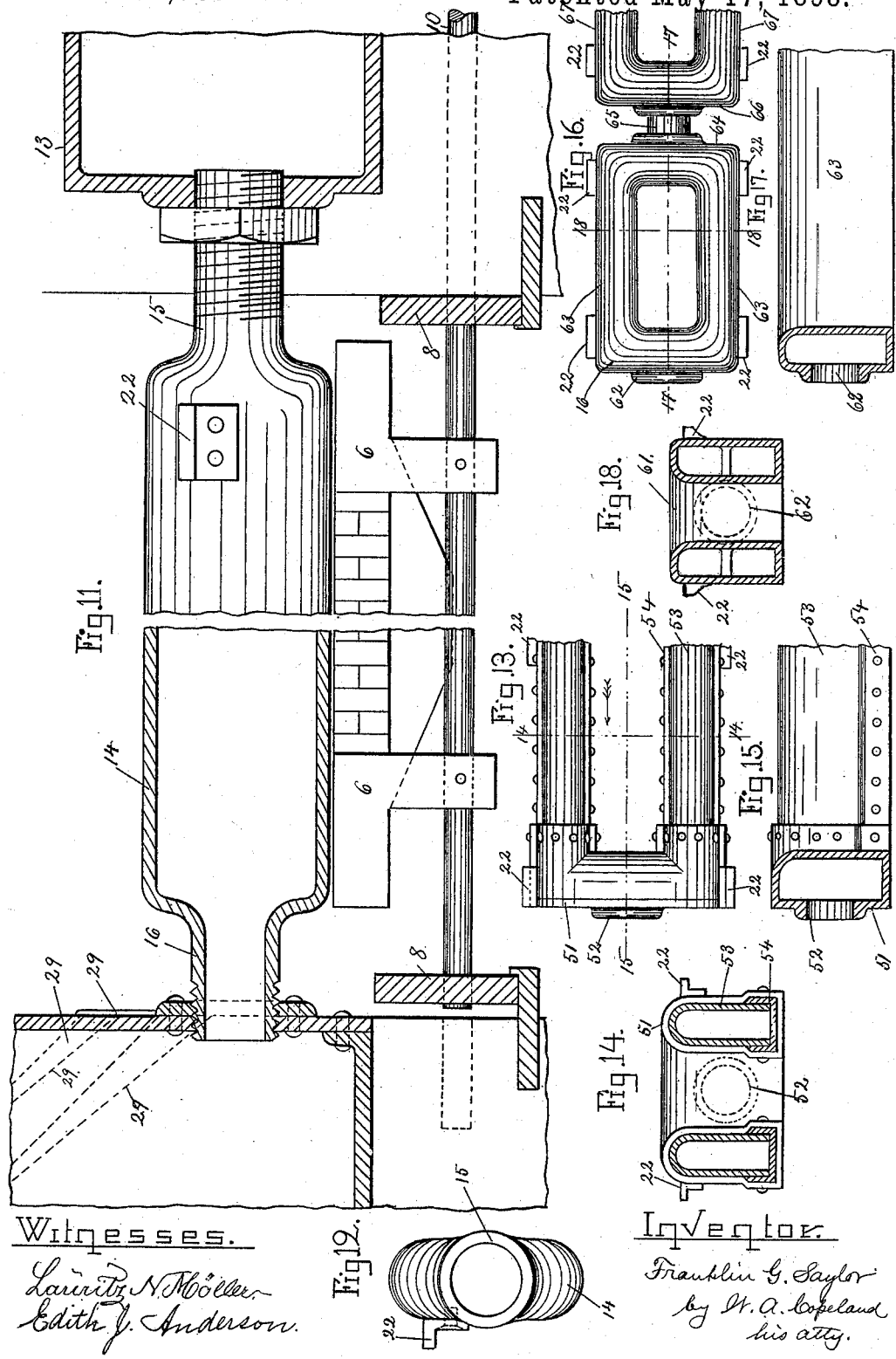
Witnesses.
Lauritz N. Möller
Edith J. Anderson
Inventor.
Franklin G. Saylor
by W. A. Copeland
his atty.

(No Model.) 6 Sheets—Sheet 6.

F. G. SAYLOR.
STEAM OR HOT WATER GRATE AND GENERATOR.

No. 604,088. Patented May 17, 1898.

Witnesses.
Lauritz N. Möller
Edith J. Anderson.

Inventor.
Franklin G. Saylor
by W. A. Copeland
his atty.

UNITED STATES PATENT OFFICE.

FRANKLIN G. SAYLOR, OF BOSTON, MASSACHUSETTS.

STEAM OR HOT-WATER GRATE AND GENERATOR.

SPECIFICATION forming part of Letters Patent No. 604,088, dated May 17, 1898.

Application filed June 15, 1897. Serial No. 640,800. (No model.)

*To all whom it may concern:*

Be it known that I, FRANKLIN G. SAYLOR, a citizen of the United States, residing at Boston, in the county of Suffolk and State of Massachusetts, have invented certain new and useful Improvements in Steam or Hot-Water Grates and Generators, of which the following, taken in connection with the accompanying drawings, is a specification.

My invention relates to generators for either steam or hot water, and has more particular reference to a water-grate and connections for promoting the circulation and the combustion; and the objects of my invention are to make a generator which shall consume the smoke and other products of combustion, expose a large surface area of the water-wall to the most intense heat of the furnace, and to so construct the water-grate and connections and the walls and settings of the generator as to both economize fuel and intensify the heat obtained.

My invention consists in a box or pocket grate with walls formed in whole or in part of water-legs having connections through which water circulation is maintained from the boiler to and through the water-grate and return to the boiler, and in the other novel features which will be fully described in the specification, and particularly pointed out in the claims at the end thereof.

In the drawings I have illustrated my invention as applied to a return fire-tube boiler, but it may be applied to various other forms of boilers.

Figure 20:
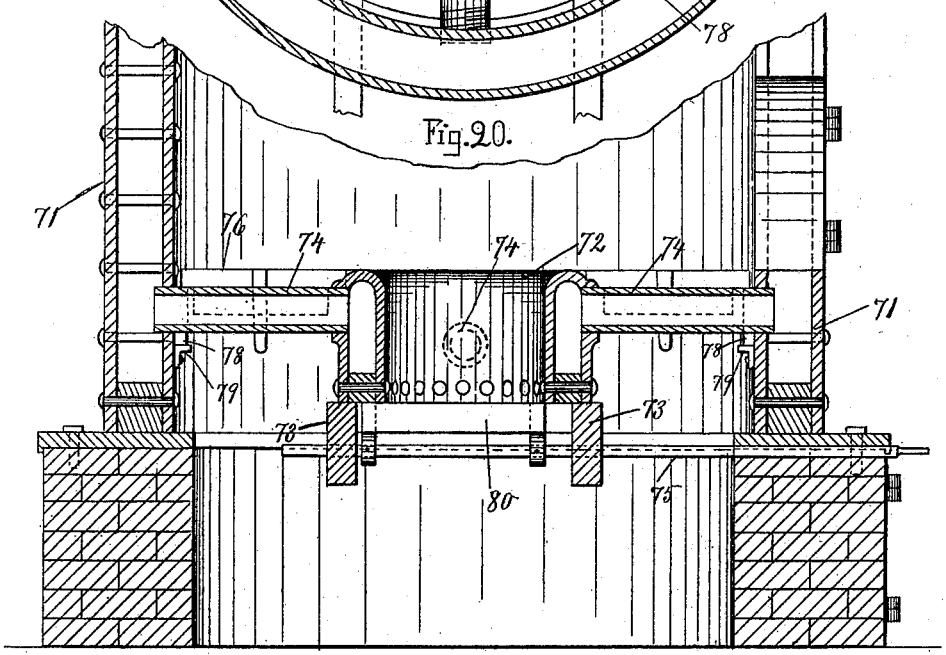
Figure 21:
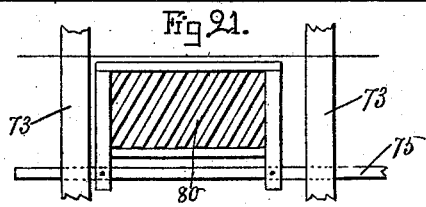

Figure 1 is a plan of a grate and its supports and of the mud-drum in front and the connections of the water-legs therewith and the rear connections with the bridge-tank, which is broken away, the grate-bars being omitted from the left-hand section to clearly show the side rests, the end blocks, which should go between the ends at front and rear of the right-hand pair of water-legs to close the ends of the trough, being omitted to show the lugs on which the blocks are supported. Fig. 2 is a cross-section on line 2 2 of Fig. 1, looking toward the rear, but with the left-hand grate in position. Fig. 3 is a side elevation, partly in section, on line 3 3 of Fig. 1, illustrating the connections of the water-leg with the boiler, the hot-air passages through the bridge-wall tank, and the baffle-wall. Fig. 4 is a section on line 4 4 of Fig. 3, looking toward the front. Fig. 5 is a section on line 5 5 of Fig. 3, looking toward the rear, the bridge-tank wall being cut away to more clearly show the tank. Fig. 6 is a side elevation of one of the water-legs and connections, partly in section, on a larger scale, the end blocks being omitted. Fig. 7 is a plan of a portion of one of the water-legs and the extension-lip which is to rest on the end resting-bar. Fig. 8 is an end view of Fig. 7. Fig. 9 is a side elevation of Fig. 7. Fig. 10 is an isometric illustration of a modified form of water-leg and showing connection with the front mud-drum. Fig. 11 is a side elevation, partly in section, illustrating another modified form of water-leg. Fig. 12 is an end view of the water-leg of Fig. 11 detached. Fig. 13 is a plan of still another modified form of water-leg. Fig. 14 is a section on line 14 14 of Fig. 13, and Fig. 15 is a section on line 15 15 of Fig. 13. Figs. 16, 17, and 18 illustrate yet another modification of water-leg. Figs. 19, 20, and 21 illustrate the application of my invention to a water-leg boiler.

1 designates a boiler; 2, the side-wall setting; 17, the front wall; 18, the doors to the fire-box; 19, the doors to the ash-pit; 3, the front circulating-pipes, and 4 the rear circulating-pipes.

The grates represented are of the so-called "box" or "pocket" or "trough" grate type, in which the grates are alternately on different levels, the drawings showing five grates, the first, third, and fifth of which are surface grates, each being designated by the numeral 5, and the second and fourth are lower grates, each designated by the numeral 6 and forming the bottoms of the boxes or pockets. The two side carrying-bars for the grates are marked 7, the two end rests are marked 8, and the center rest 9. The grate-bars 10 are operated by the levers 11 to shake and turn the lower grates. The rear circulating-pipes 4, which are virtually water-legs, lead from the boiler 1 to the bridge-wall tank or rear mud-drum 12, and the front circulating-pipes 3 lead from the front mud-drum 13 back to the boiler, the circulation from the bridge-wall tank to the front mud-drum being through the hollow water grate walls or legs 14, as will be more particularly described hereinafter. A blow-off pipe 20 leads from the mud-drum 13, and a blow-off pipe 21 leads from the bridge-wall tank 12. The circulating-pipes may stand at any angle, as shown by the dotted lines marked 28 in Fig. 3. With the box or pocket type of grate a much more complete combustion and more intense heat is obtained than by use of an ordinary flat-top grate, and one of the objects of my invention is to utilize and economize this heat by having the water circulate through conductors which are directly and closely exposed to this heat at the location of greatest intensity. The side walls of the boxes or pockets as heretofore made have usually been either solid or perforated for air circulation. I make these side walls 14 hollow, with tubular connections 15 with the mud-drum 13 in front and connections 16 with the bridge-wall tank 12 at the rear for the circulation of the water. These side water walls or legs are preferably oblong in cross-section, as clearly shown in Figs. 2 and 5, partly because it is undesirable to have too thick a wall between the grates to obstruct the air circulation, but mainly because a thin wall of water will heat better. With the circulating-pipes arranged as shown in Figs. 3, 4, and 5 the circulation will start from the rear circulating-pipes and go through the water-grates from rear to front, as the rear circulating-pipes connect with the boiler at a higher level than do the front circulating-pipes. The tubular connections 15 and 16 are preferably of smaller sectional area than the water-legs, whereby the water which has reached a high degree of heat in the water-legs is forced rapidly out, and an active circulation is maintained throughout the entire system. On one side of each of the water walls or legs 14 are lugs 22, and on the side of the side carrying-bars 7 are also similar lugs, which form rests for the upper grates, said upper grates being removable. On the ends of the said water-legs, at both front and rear, are extension-lips 23, which rest on the end bars 8. Crosswise of the water-legs are inside braces 24. End blocks 25, of fire-brick or other suitable material, close the ends of the trough between the water-legs, or, as shown in some of the modifications hereinafter described, each pair of water-legs has a water connection between the two legs at the ends.

The fuel fills the trough to the level of the surface grates, and then a thin layer is spread over the whole top, so that there is burning fuel in the trough in direct contact with one side of each water-leg and also on the top surface of the water-legs. The thick body of fuel in the trough, owing to its depth, burns more slowly than the thinner body on the surface grates and is more of a gas-generator, the gases which arise therefrom mingling at the surface with the fresh air which comes up through the surface grates.

The bridge-wall tank 12 is supported on the wall 26 and preferably has a facing 27 of fire-brick for protection. The bridge-wall and tank form a partition between the fire-box and combustion-chamber, rising to some distance above the grate, but not entirely to the top of the chamber, thus allowing a passage over the top of the wall for the smoke and other products of combustion into the combustion-chamber. Extending from front to rear through the facing 27 and bridge-tank 12 are a series of hot-air passages 29 to take the air at its extreme heat near the surface and conduct it into the rear part of the combustion-chamber, where it comes into contact with the smoke and other unconsumed products of combustion and ignites them. In this kind of grate the fire just above the surface grates has the greatest intensity. These hot-air ducts are preferably arranged one for each grate and starting alternately at different levels, as shown in Fig. 5, being upwardly inclined from front to rear through the tank, but all coming out on the rear side on the same level with each other. (See Figs. 3 and 5, in which the passages are shown in dotted lines.) The entrance ends of the ducts for the surface grates are a little lower than the ducts from the trough-grates, so as to afford passage for fresh air from below the grates, which mingles with the highly-heated air taken from the surface. The exact location of these ducts and the angle will vary somewhat according to the boiler and the conditions of use. The ducts may be horizontal.

A baffle-wall 30, extending crosswise of the combustion-chamber, at the upper part thereof, hangs downward below the level of the top of the bridge-wall tank, so that the current of hot air will be deflected and retarded after it passes over the top of the bridge-tank before it can pass to the rear part of the chamber and gain entrance to the return fire-tubes of the boiler, so as to make the combustion more complete. It is desirable, however, not to contract the passage, and therefore the horizontal distance from the baffle-wall to the bridge-wall tank should be about the same as the vertical distance from the bottom of the baffle-wall to the bottom of the chamber.

By means of the water-leg grate and the active circulation of water obtained the sediment which always tends to collect at the bottom of the boiler is carried down through the rear circulating-pipe to the bridge-wall tank, and from thence the bulk of it will also be carried on through the water-legs to the front mud-drum, where it will be deposited until blown off.

In the modification shown in Fig. 10 the water-legs forming the walls of the trough are composed of a coil of pipe 41, one end 42 of the coil being connected with the front mud-drum and the other end, broken away in the drawings, being connected with the bridge-wall tank. In this way there is a circulation of the water through both walls of the trough and entirely around the same and through the entire coil before it can reach the mud-drum. There is a bottom grate to this trough, as in the form previously described, the grate being omitted in the drawing of Fig. 10 to more clearly illustrate the form of water-leg.

In the modification shown in Figs. 11 and 12 the water-leg still retains the same general form of greater depth than thickness, as already described, and also the contracted connections with the mud-drum and with the bridge-wall tank. The water-leg in this form is a flattened pipe with contracted ends integral therewith to make the connections instead of separate pipe connections.

In the modification shown in Figs. 13, 14, and 15 each pair of water-legs is connected together at each end by a hollow cap or head 51, which has an opening 52 to receive the pipe connections 15 and 16 with the mud-drum and bridge-wall tank, respectively. The legs are illustrated in this form as composed of an inverted-U-shaped upper portion 53, set into a flanged lower portion 54, the two portions being riveted together, and the oblong-shaped tube thus formed then having the caps or heads put on the ends and riveted, the single connection of each head with the mud-drum and tank serving for both legs of each pair. In this form of construction the connections are more easily made than when made in one single piece. Lugs 22 for supporting the grates are secured to the sides of the legs.

In the modification shown Figs. 16, 17, and 18 there is a union of each pair of legs at the end, there being common inlet and outlet openings 62 for connection with the mud-drum and bridge-wall tank, the head 61 in this case being integral with the legs 63. The legs are also made in series, the front pair being connected together at their rear ends by a connecting portion 64, which is connected by a pipe 65 with the head 66 of the next pair 67, thus forming a series of pockets connected together, the rear pocket being connected with the bridge-wall tank.

In the modification shown in Figs. 19, 20, and 21, in which my invention is represented as applied to a water-leg boiler, Fig. 19 is a cross-section through the water-legs of the boiler, showing in interior plan only so much as is necessary to properly illustrate the invention. Fig. 20 is a vertical section, and Fig. 21 is a detail of the dumping part of the grate in the bottom of the box or pocket. 71 is the water-leg of the boiler. Inside of the chamber formed by said water-leg 71 is a smaller ring-shaped water-leg 72, supported on carrying-bars 73. Pipes 74 connect this water-leg with water-leg 71 of the boiler. At the bottom of the central opening through the water-leg 72 are dump-grates 80, operated by the grate-bars 75, thus forming a pocket, the water-leg 72 forming the side walls of the pocket. The surface grates 76 are supported at the inside edge by lugs 77 on the side of water-leg 72, and at the outer edge are supported on the rail 78, resting on the lugs 79 on the inside of the boiler-leg. A portion only of the surface grate is shown for clearness of illustrating the other parts. Instead of a single pocket and water-leg 72, there may be several connected together.

What I claim is—

1. A box or pocket grate consisting of grates of alternating level, the grate on the lower level forming the bottom of the box or pocket, and having water-legs which form the sides of the box or pocket, substantially as described.

2. In combination with a boiler or hot-water reservoir, a box or pocket grate consisting of grates of alternating level, the grate on the lower level forming the bottom of the pocket and having water-legs which form the sides of the pocket, and waterway connections between the boiler or reservoir and said water-legs whereby circulation is completed from the boiler or reservoir to the water-legs, thence through the water-legs and return to the boiler or reservoir by another way, substantially as described.

3. In combination with a boiler or hot-water reservoir, a box or pocket grate consisting of grates of alternating level, the grate on the lower level forming the bottom of the pocket and having water-legs which form the sides of the pocket, a bridge-wall tank at the rear of the grate and water-pipe connection between the boiler or reservoir and said tank and between the said tank and the water-legs, a mud-drum at the front end of the grate, and water-pipe connections between said water-legs and said mud-drum and between said mud-drum and the boiler or reservoir whereby a complete circulation is made, substantially as described.

4. In combination with a boiler or hot-water reservoir, a box or pocket grate consisting of grates of alternating level, the grates on the lower level forming the bottom of the pocket and having water-legs which form the sides of the pocket, a bridge-wall tank at the rear of the grate and water-pipe connection between the boiler or reservoir and said tank and between the said tank and the water-legs, a mud-drum at the front of the grate and water-pipe connection between the water-legs and the mud-drum, and between the mud-drum and the boiler or reservoir, the outlet from the water-legs being of smaller sectional area than the sectional area of the water-legs, substantially as and for the purpose described.

5. In combination with a boiler or hot-water reservoir and grate, a bridge-wall tank at the rear of the grate, a partition between the fire-box and combustion-chamber but not extending to the top of the chamber and having a series of hot-air ducts leading from the fire-box to the combustion-chamber, substantially as described.

6. In combination with a boiler or hot-water reservoir and grate, a bridge-wall tank at the rear of the grate rising above the level thereof but not extending to the top of the chamber and having a series of hot-air ducts from the fire-box through the tank to the combustion-chamber, the openings to said ducts being in part above and in part below the surface of the grate, substantially as described.

7. In combination with a boiler or hot-water reservoir, a box or pocket grate consisting of grates of alternating level, the grate on the lower level forming the bottom of the pocket and having water-legs which form the sides of the pocket, a bridge-wall tank at the rear of the grates and water-conduits from the boiler or reservoir to the tank, from the tank to the water-legs and from the water-legs to the boiler or reservoir said bridge-wall tank forming a partition back of the fire-box part way to the top of the chamber, and having a series of hot-air ducts leading from different levels through the tank to the combustion-chamber, the entrances to some of the ducts being so located as to conduct fresh air from below the surface grates as well as the hot air from above the surface, and other ducts conducting the gases which rise from the box part of the grates, substantially as described.

8. In combination with a boiler or hot-water reservoir and grate, a bridge-wall tank at the rear of the grate rising part way above the level thereof, hot-air ducts leading from the fire-box through the tank and into the combustion-chamber, a baffle-wall within the combustion-chamber at some distance back of the tank and projecting from the roof part way to the bottom of the chamber, substantially as described.

9. In combination with a boiler or hot-water reservoir and grate, a bridge-wall tank at the rear of the fire-box, and a series of hot-air ducts from the fire-box, through said tank and into the combustion-chamber, the said ducts starting at alternating levels and opening into the combustion-chamber at a higher level than the entrance ends, substantially as described.

10. In a box or pocket grate consisting of grates of alternating level, a series of pockets of which the walls thereof are composed of water-legs, the water-legs of one pocket being connected by a water-conduit with the water-legs of another pocket, substantially as described.

In testimony whereof I have signed my name to this specification, in the presence of two subscribing witnesses, on this 10th day of June, A. D. 1897.

FRANKLIN G. SAYLOR.

Witnesses:
 WILLIAM A. COPELAND,
 EDITH J. ANDERSON.